Jan. 5, 1965

JAMES E. WEBB
ADMINISTRATOR OF THE NATIONAL
AERONAUTICS AND SPACE
ADMINISTRATION
MECHANICAL COORDINATE CONVERTER 3,163,935

Filed Dec. 26, 1962

INVENTOR.
RICHARD M. BECKWITH
BY
ATTORNEYS

Jan. 5, 1965

JAMES E. WEBB
ADMINISTRATOR OF THE NATIONAL
AERONAUTICS AND SPACE
ADMINISTRATION
MECHANICAL COORDINATE CONVERTER 3,163,935

Filed Dec. 26, 1962

INVENTOR.
RICHARD M. BECKWITH
BY
ATTORNEYS

INVENTOR.
RICHARD M. BECKWITH
BY
ATTORNEYS

United States Patent Office 3,163,935
Patented Jan. 5, 1965

3,163,935
MECHANICAL COORDINATE CONVERTER
James E. Webb, Administrator of the National Aeronautics and Space Administration, with respect to an invention of Richard M. Beckwith
Filed Dec. 26, 1962, Ser. No. 247,419
2 Claims. (Cl. 33—1)

This invention relates to mechanical coordinate converters, that is, to apparatus for converting information derived from either an azimuth-elevation coordinate system or an hour angle-declination system to the other system.

Included in the objects of this invention are:

First, to provide an apparatus which is particularly useful in conjunction with tracking antennas for spacecraft or satellites which may be oriented in either the azimuth-elevation coordinate system or hour angle-declination coordinate system to facilitate ready conversion from one system to the other.

Second, to provide an apparatus of this type which illustrates graphically the relation between two different coordinate systems, and therefore serves as a teaching aid.

Third, to provide an apparatus of this type which supplements electronic digital converters, especially under conditions wherein one type of antenna oriented in one system acquires a radio signal from an unpredicted location in space, and the need arises to provide coordinate information to the operators of an antenna oriented in the other system to permit immediate signal acquisition by the other antenna.

With the above and other objects in view, as may appear hereinafter, reference is directed to the accompanying drawings in which.

Figure 1:
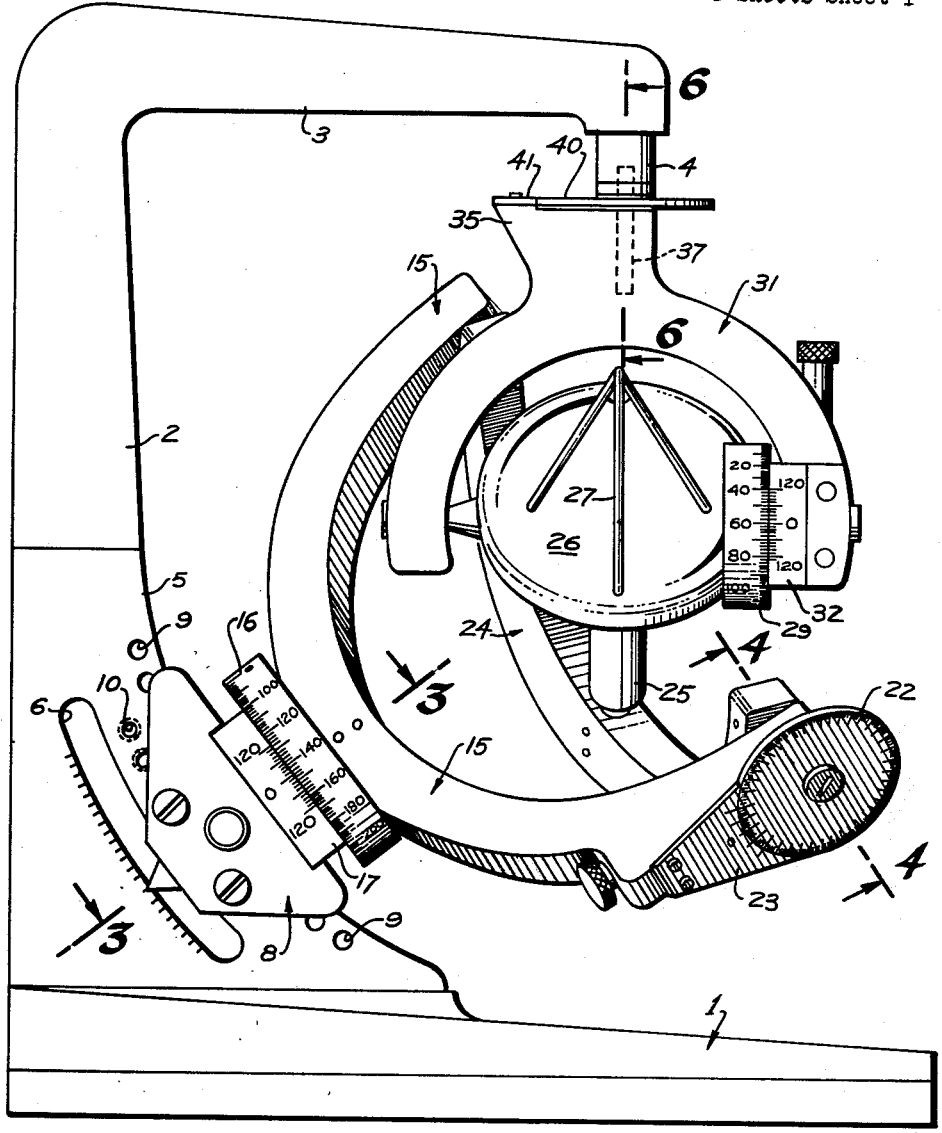
FIGURE 1 is a perspective view showing the mechanical coordinate converter in one typical position.
Figure 2:
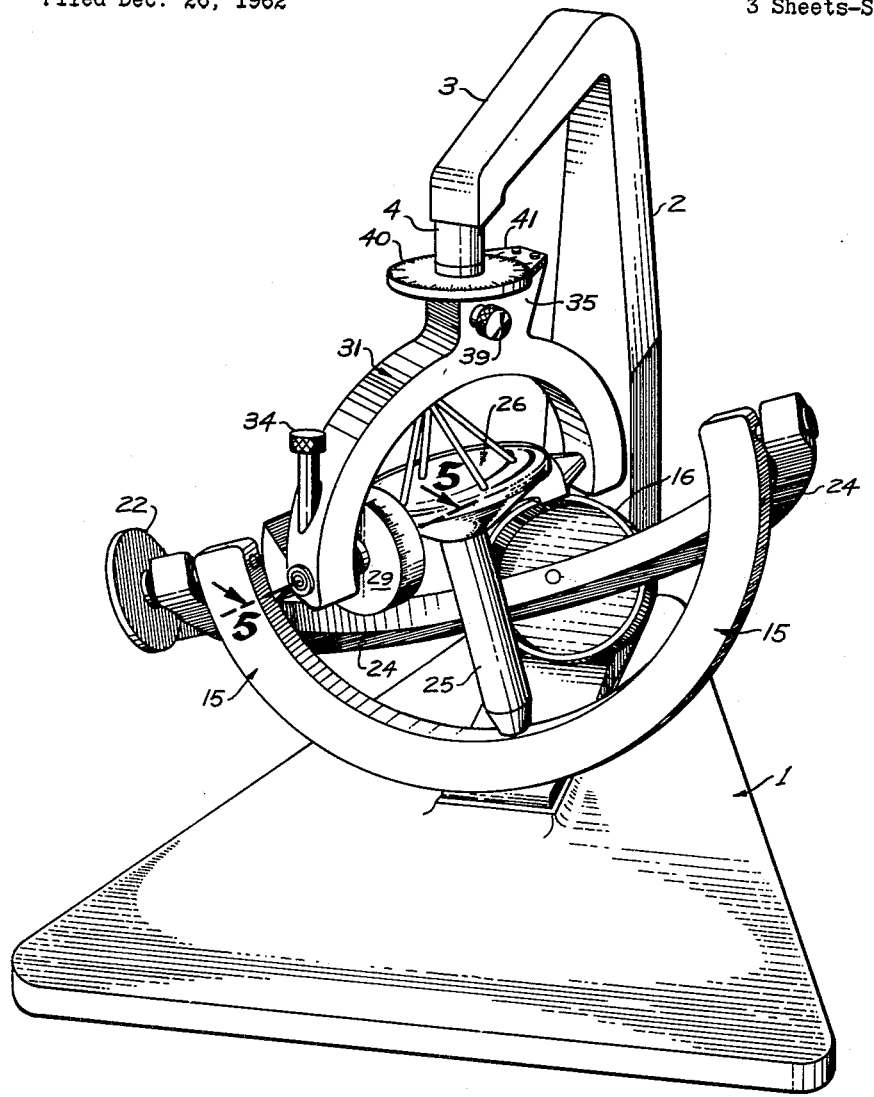
FIGURE 2 is another perspective view showing the mechanical coordinate converter from another aspect at approximately right angles to FIGURE 1.
Figure 3:
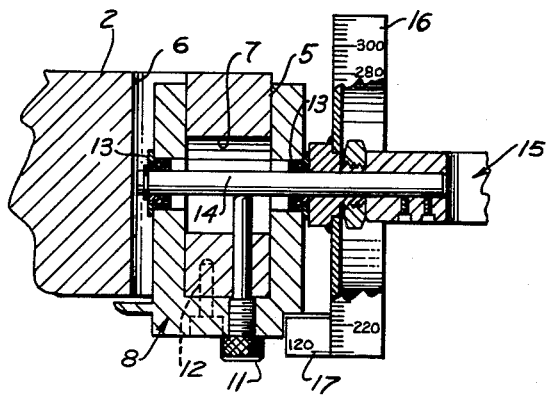
FIGURE 3 is a fragmentary, sectional view taken through 3—3 of FIGURE 1.
Figure 4:
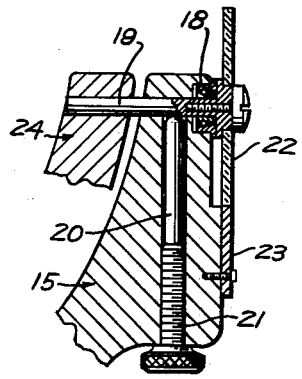
FIGURE 4 is a fragmentary, sectional view taken through 4—4 of FIGURE 1.
Figure 5:
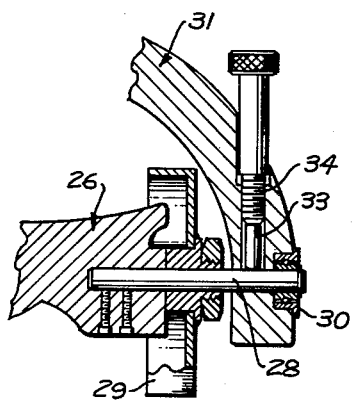
FIGURE 5 is a fragmentary, sectional view taken through 5—5 of FIGURE 2.
Figure 6:
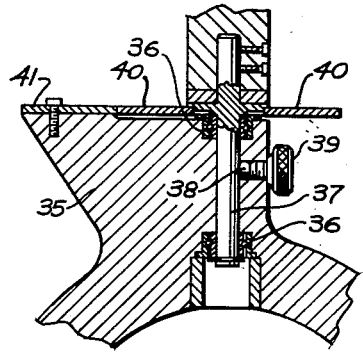
FIGURE 6 is a fragmentary, sectional view taken through 6—6 of FIGURE 1.

The mechanical coordinate converter includes a base 1 having at one side an upwardly extending pedestal 2, which in turn is provided with a horizontally extending bracket 3 projecting over the base 1 and having a depending extension 4.

Adjacent the base 1 the pedestal 2 is provided with an arcuate portion 5, the center of curvature of which intersects the vertical axis of the depending extension 4. An arcuate cross slot 6 is formed in the pedestal 2 in concentric relation with the arcuate portion 5. The cross slot 6 is intersected by a channel 7 communicating with the face of the arcuate portion 5.

A slide member 8 of channel-shaped cross section fits over one side of the pedestal 2 in such a manner that its flanges overlie the face of the arcuate portion 5, and extend into the cross slot 6 so as to move about the center of curvature defined by the arcuate portion 5. An arcuate set of locating sockets 9 and a corresponding arcuate set of screw holes 10 are provided. A selected socket receives a locating and anchor pin 11 whereas the screw holes 10 receive screws 12.

The flanges of the slide member 8 are provided with coaxial openings in which are mounted ball bearings 13 which journal a polar axis shaft 14. The sockets 9 and screw holes 10 are so located that for selected locations of the earth's surface the shaft 14 may be disposed parallel with the axis of rotation of the earth under conditions in which the depending extension 4 defines an azimuth axis.

Secured to the projecting end of the polar axis shaft 14 is a semicircular outer or polar gimbal 15. Fixed to the polar gimbal 15 adjacent the slide member 8 is a polar scale cylinder 16. Mounted on the slide 8 is a coacting vernier segment 17.

Journaled in the extremities of the polar gimbal 15 on bearings 18 is a pair of coaxial declination shafts 19. These shafts define the declination axis which is at right angles to the shaft 14 which defines the polar axis. One of the declination shafts 19 is engaged by a locking pin 20, which is backed by a locking screw 21 fitted within one extremity of the polar gimbal 15. The radially outer extremity of this shaft receives a declination scale disk 22 which rotates therewith. A vernier plate 23 is mounted on the polar gimbal 15 for cooperation with the declination scale disk 22.

The two declination shafts 19 journal therebetween a semicircular intermediate or declination gimbal 24. Midway between the extremities of the declination gimbal 24 there is rotatably mounted an antenna axis post 25, defining an axis at right angles to the axis of the shafts 19.

Mounted on the extremity of the post 25 between the declination shafts 19 is a radar antenna simulator 26. The radar antenna simulator is in the form of a disk with a tripod 27 forming a pointer, the point of which coincides with the axis of the post 25.

The radar antenna simulator 26 is provided with a diametrically located pair of elevation axis shafts 28, which define an axis passing through the declination axis defined by the shafts 19. Secured to one of the shafts 28 is an elevation scale cylinder 29.

The radial extremities of the elevation axis shafts 28 are journaled by bearings 30 located in the extremities of a semicircular inner or elevation gimbal 31. One of the extremities of the gimbal 31 is provided with a vernier segment 32 which coacts with the elevation scale cylinder 29. This arm of the elevation gimbal 31 receives a locking pin 33 backed by a locking screw 34, for the purpose of locking the elevation gimbal 31 and radar antenna simulator 26 against relative rotation.

The central portion of the elevation gimbal 31 is provided with a boss 35 extending at right angles to the axis of the shafts 28. The boss 35 is provided with bearings 36 which journal an azimuth axis shaft 37 adapted to project upwardly into and be secured within the depending extension 4 of the bracket 3. The boss 35 receives a locking pin 38 backed by a locking screw 39, for the purpose of locking the elevation gimbal 31 against rotation about the azimuth axis shaft 37.

Secured to the azimuth axis shaft 37 is an azimuth dial scale 40. The boss 35 is provided with a lateral extension which receives a vernier plate 41 for cooperation with the azimuth dial scale 40.

The mechanical coordinate converter is employed as follows:

If the polar and declination angles are known, the declination gimbal 24 and polar gimbal 15 are adjusted so that the declination scale disk 22 and polar scale cylinder 16 are set so as to indicate the known angles. When this is accomplished, the azimuth dial scale 40 and the elevation scale cylinder 29 will indicate the corresponding azimuth and elevation angles. Conversely, if the gimbals connected with the azimuth dial scale 40 and the radar antenna simulator 26 are adjusted to indicate known azimuth and elevation angles, the corresponding polar and declination angles may be determined.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A mechanical converter, comprising:
   (a) a frame structure including a base, a pedestal extending upwardly therefrom, and a support extending laterally from said pedestal over said base;
   (b) a journal at the extremity of said support defining an azimuth axis;
   (c) an arcuately movable journal carried by said pedestal adapted for adjustment to define a polar axis corresponding to a selected station on the earth's surface and intersecting said azimuth axis;
   (d) a semicircular polar axis gimbal journaled at its midpoint by said polar axis journal;
   (e) a semicircular azimuth axis gimbal journaled at its midpoint by said azimuth axis journal;
   (f) a semicircular declination axis gimbal journaled at its extremities between the extremities of said polar axis gimbal;
   (g) said gimbals being of graduated size to internest and to share a common center point at the intersection of said azimuth and polar axes;
   (h) a structure interconnecting said azimuth and declination gimbals, including pivot means connected to the extremities of said azimuth gimbal to define an elevation axis, and pivot means perpendicular to said elevation axis and said declination axis joined to said declination gimbal;
   (i) polar and declination measuring means associated with said polar and declination gimbals;
   (j) and azimuth and elevation measuring means associated with said azimuth gimbal and said elevation axis pivot means.

2. A mechanical converter, comprising:
   (a) a frame structure including a base, a pedestal extending upwardly therefrom, and a support extending laterally from said pedestal over said base;
   (b) a journal at the extremity of said support defining an azimuth axis;
   (c) a journal on said pedestal defining a polar axis intersecting said azimuth axis;
   (d) a semicircular polar axis gimbal journaled at its midpoint by said polar axis journal;
   (e) a semicircular azimuth axis gimbal journaled at its midpoint by said azimuth axis journal;
   (f) a semicircular declination axis gimbal journaled at its extremities between the extremities of said polar axis gimbal;
   (g) said gimbals being of graduated size to internest and to share a common center point at the intersection of said azimuth and polar axes;
   (h) and a structure interconnecting said azimuth and declination gimbals, including pivot means connected to the extremities of said azimuth gimbal to define an elevation axis, and pivot means perpendicular to said elevation axis and said declination axis joined to said declination gimbal.

References Cited by the Examiner
UNITED STATES PATENTS

| | | | |
|---|---|---|---|
| 1,547,940 | 7/25 | Monney | 33—1.5 |
| 1,845,860 | 2/32 | Willis | 33—1.5 |
| 2,466,225 | 4/49 | Gee | 33—1.5 |
| 2,599,381 | 6/52 | Gerks | 33—1.5 |

ISAAC LISANN, *Primary Examiner.*